United States Patent [19]

Kyros

[11] 4,006,256
[45] Feb. 1, 1977

[54] OLIVE STUFFED WITH RECONSTITUTED PIMENTO AND METHOD OF PRODUCTION

[75] Inventor: George C. Kyros, West Chester, Ill.

[73] Assignee: Beatrice Foods Co., Chicago, Ill.

[22] Filed: July 11, 1975

[21] Appl. No.: 595,153

[52] U.S. Cl. .............................. 426/102; 426/276; 426/282; 426/517; 426/803

[51] Int. Cl.$^2$ ...................... A23B 7/10; A23L 1/04

[58] Field of Search .......... 426/276, 282, 615, 102, 426/92, 575, 516, 517, 138, 803, 573, 284; 99/494

[56] References Cited

UNITED STATES PATENTS

| | | | |
|---|---|---|---|
| 1,133,054 | 3/1915 | Newcomb | 426/102 |
| 2,351,788 | 6/1944 | Smith | 426/102 |
| 2,436,463 | 2/1948 | Dellen et al. | 426/102 |
| 2,536,708 | 1/1951 | Angermeier | 426/575 |
| 2,567,590 | 9/1951 | Ashlock | 99/494 |
| 2,643,694 | 6/1953 | Ashlock | 99/494 |
| 2,649,378 | 8/1953 | Traishman et al. | 426/615 X |
| 2,786,763 | 3/1957 | Rivoche | 426/575 |
| 2,791,508 | 5/1957 | Rivoche | 426/575 X |
| 2,854,340 | 9/1958 | Kohler | 426/575 X |
| 2,859,115 | 11/1958 | Rivoche | 426/575 |
| 2,992,925 | 7/1961 | Green et al. | 426/92 |
| 3,093,483 | 6/1963 | Ishler et al. | 426/575 X |
| 3,362,831 | 1/1968 | Szezeshiak | 426/575 X |
| 3,526,514 | 9/1970 | Gralak et al. | 426/620 |
| 3,891,776 | 6/1975 | Carpenter et al. | 426/276 X |
| 3,922,360 | 11/1975 | Sneath | 426/276 X |
| 3,932,673 | 1/1976 | Webster | 426/282 X |

Primary Examiner—S. Leon Bashore
Assistant Examiner—Kenneth M. Schor
Attorney, Agent, or Firm—Murray and Whisenhunt

[57] ABSTRACT

Pitted olives are stuffed with a reconstituted pimento prepared by shaping an aqueous dispersion of macerated pimento having dissolved therein alginic acid or a salt thereof. The shaped dispersion is contacted with a solution of a divalent cation and a non-reversible gel is formed, which gel is cut and stuffed into pitted olives with a conventional olive-stuffing machine.

45 Claims, 1 Drawing Figure

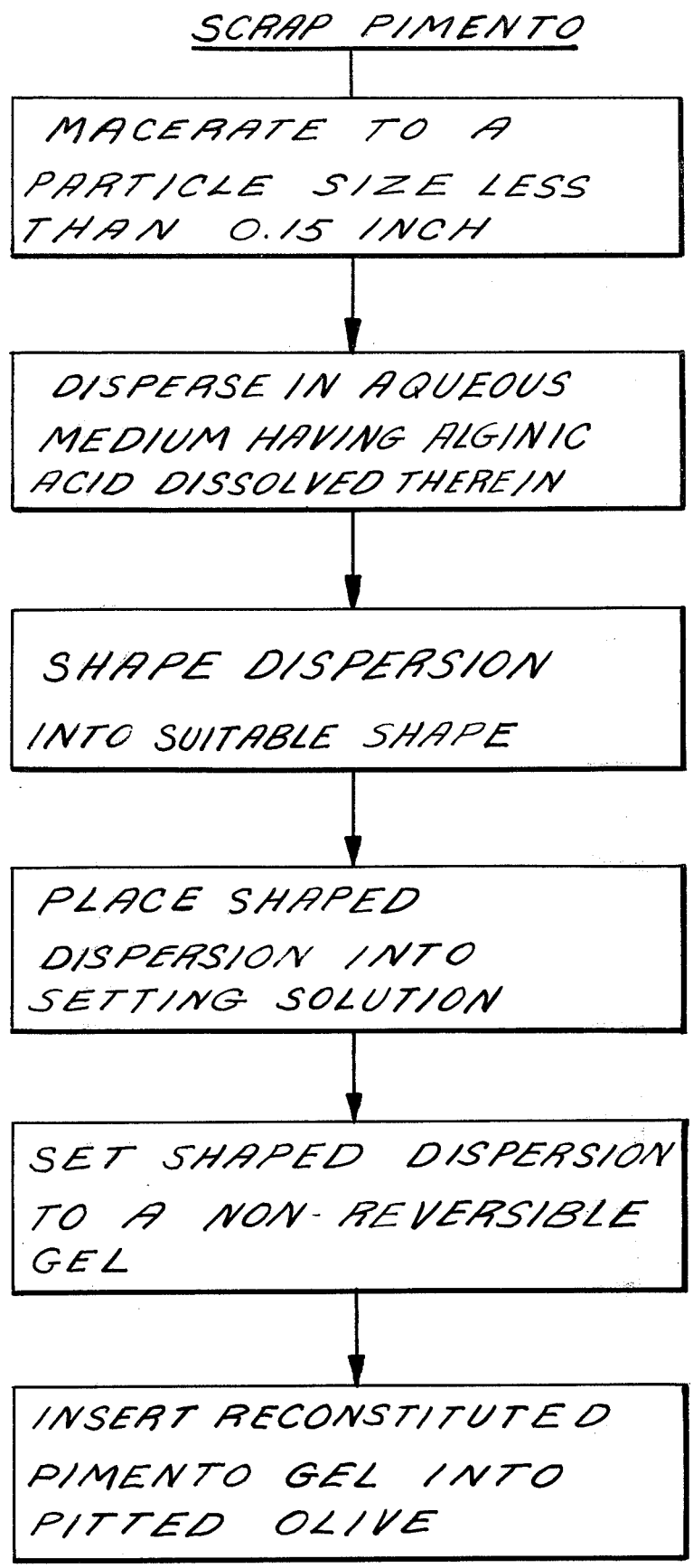

OLIVE STUFFED WITH RECONSTITUTED PIMENTO AND METHOD OF PRODUCTION

The present invention is concerned with the production of pitted and pimento stuffed olives, wherein the pimento stuffing is a reconstituted pimento.

BACKGROUND OF THE INVENTION

Pimento stuffed olives are well known items of commerce. Basically, green olives are pitted in such a manner as to leave a cavity in the central portion of the pitted olive. That cavity is stuffed with a small, cut, section of natural pimento. The section is, generally, rectangular in planar shape and will have a thickness of from as little as 0.1 inch to as great as 0.5 inch, depending primarily on the size of the green olive and the cavity incurred in removing the pit thereof. This cut section of natural pimento is formed into a loop of a radius consistent with the diameter of the cavity in the pitted olive. The section of pimento is then inserted into the cavity, filling the cavity and being held therein, essentially, by the friction between the walls of the cavity and the section of pimento.

As can be appreciated from the foregoing, the section of pimento must be of a relatively critical size and shape in order to be neatly stuffed and tightly held into the cavity of the pimento. Natural pimento, on the other hand, is irregular in shape and in cutting these necessary sizes and shapes from natural pimento, considerable amounts of "scrap" pimento results. This incurs a considerable economic waste, since applications for scraps of pimento are severely limited. Further, the cost of the pimento and the stuffing operation constitute a more significant cost of the stuffed olive. Under the circumstances, the art has sought ways of utilizing the scraps of pimento in stuffing other olives.

However, efforts in the art to use these scraps of pimento have not met, generally, with commercial success, primarily due to the exacting requirements for pimento sections suitable for stuffing pitted olives. The art and machinery for pitting and stuffing olives is rather specifically developed. As can be appreciated, the machine must be rather exacting in its mechanical operation in order that the pit can be cleanly and neatly removed. Additionally, the machine must carefully and neatly place a section of pimento in the pit cavity and that section of pimento must be placed in such a manner that it will be tightly engaged by the cavity. Representative of the machinery in the art of stuffing olives is U.S. Pat. No. 2,578,469, which disclosure is incorporated herein by reference. That patent indicates the complexity of the machinery involved for stuffing olives and additionally notes the necessity of having a generally-predictable pimento section for use in automatic stuffing machines. Even further precision in such machineries are indicated by U.S. Pat. Nos. 2,384,429 and 2,637,653.

The pimento section must have minimum and predictable properties in order for it to be automatically handled by an automatic stuffing machine. Thus, the pimento must be capable of being neatly severed in cutting a properly sized section so that the section will not have ragged or irregular severed portions which might interfere with automatic handling and stuffing. The pimento must be capable of being looped so that it may be stuffed into the pitted cavity. A minimum amount of strength is required in order that the pimento may be handled by the automatic machine and forced into the pitted cavity. Some resiliency of the pimento is also required to insure that the pimento, having being stuffed in the olive, will remain in the cavity. On the other hand, of course, the pimento must have a minimum moisture content and tenderness in order that the taste and mouth-feel will be acceptable to the consuming public. Of course, any utilization of scrap material must result in the stuffed olive having the general appearance of an olive stuffed with a section of natural pimento. In view of these exacting requirements, no proposal in the art for utilizing scraps of pimento in stuffing olives has had wide commercial acceptance.

The art, of course, has been aware of methods for utilizing or reconstituting fruit scraps. These methods involve varying approaches, but commonly the fruit scraps are ground and agglomerated or coagulated from an aqueous medium with calcium compounds, which affect the natural pectin, and gel the medium. U.S. Pat. No. 2,548,510 is representative of this art. A similar approach has been proposed for scrap pimento. In this method, a suspension of ground pimento is made in a solution of a gum, such as agar agar, gelatine, gum-arabic, etc. The suspension is flowed into the pitted olive and set by various methods, usually lowered temperature. U.S. Pat. No. 2,351,788 is representative of this art. However, that approach cannot be utilized on existing automatic stuffing machines and no machinery is currently available for carrying out that method. Additionally, the resulting "stuffed" olive does not have the expected appearance of a looped and stuffed pimento and is not, generally, acceptable to the consuming public. Also, that approach does not give either the mouth-feel or taste of a conventionally stuffed olive, which further decreases its acceptability to the consuming public.

The art has also proposed methods for reconstituting fruits and vegetables by preparing a suspension of a fruit or vegetable in a settable binder, such as a natural gum solution, and shaping that composition, e.g., extruding or molding, into the required shape. Artificial cherries have been molded in this manner but such products have not enjoyed commercial success, due to the rubbery and unacceptable mouth-feel. It has also been proposed to extrude a mixture of food suspended in a gel forming mixture, such as a solution of a gum, into a setting bath which will form a semi-gel. These approaches, however, generally involve the forming of a two-phase system with an outer core which has been set by the gelling bath and an inner core which remains, primarily, unset. These processes are often carried out with alginic acid or its salts and the setting bath is often an alkaline earth metal salt such as calcium chloride. U.S. Pat. Nos. 2,791,508 and 2,992,925 are representative of this art. While pimento has been suggested for reconstitution by this method, (see particularly U.S. Pat. No. 2,992,925), those methods have never been accepted commercially, since the reconstituted pimento obtained has not been capable of reproducing the exacting properties for automatic stuffing machines, as noted above.

In view of the above, the art has for a long time felt the need for a method of preparing reconstituted pimento in such a form that the reconstituted pimento can be used with automatic stuffing machines in stuffing olives. The ability to utilize the reconstituted pimento in existing automatic machines and the ability to essentially completely mimic natural pimento in taste, appearance and texture have constituted important factors in utilizing reconstituted pimento.

OBJECTS OF THE INVENTION

It is an object of the present invention to provide a method for preparing reconstituted pimento suitable for use in conventional automatic olive stuffing machines, wherein the stuffed olive has the appearance, texture and taste of an olive stuffed with a natural pimento section. It is a further object of the invention to provide a reconstituted-pimento-stuffed olive of the foregoing nature. Other objects will be apparent from the following disclosure and claims.

BRIEF DESCRIPTION OF THE INVENTION

Briefly stated, the present process for stuffing olives with the reconstituted pimento comprises macerating natural pimento, e.g., by cutting until the particle size will form a dispersion in an aqueous medium. The aqueous medium in which the dispersion is formed has dissolved therein from 1% to 10% by weight of alginic acid (or a food-grade salt thereof). The dispersion is shaped into a suitable form for inserting into a pitted olive, and preferably for utilizing in a conventional automatic stuffing machine, although the shaped dispersion may be further cut for this purpose. The dispersion is contacted with a setting solution of a food-grade compound having a water-soluble, divalent cation, whereby the alginic acid is non-reversibly gelled to form shape-sustaining reconstituted pimento. This setting process establishes the properties required for handling and stuffing with automatic stuffing machines. Thereafter, the reconstituted pimento is stuffed into a pitted olive in the conventional manner of an automatic stuffing machine. In other words, the reconstituted pimento is then handled in the automatic stuffing machine in the same manner as the natural pimento sections. Alternately, the automatic stuffing machines may be slightly modified whereby instead of utilizing individual sections of the so-processed reconstituted pimento, the machine will handle a belt or ribbon of the reconstituted pimento, and this belt or ribbon is severed prior to final handling and stuffing in the pitted olive.

Of course, the process will be normally carried out with scrapped parts of natural pimento, as explained above, although off-colored or discolored pimento or pimento parts may be additionally used.

The shaping step will normally provide a thickness handleable by the automatic stuffing machine, e.g., a thickness of from about 0.125 inch to 0.3 inch, although here again slicing may be used to provide those thicknesses, if desired.

The texture and mouth-feel of the reconstituted pimento, of course, will depend to a large measure on the particle size of the macerated pimento. Thus, it is greatly preferred that the macerated pimento have a particle size at least less than 0.15 inch in a maximum dimension, although at least less than 0.05, e.g., 0.01 inch is preferred.

The aqueous medium in which the alginic acid (or the food-grade salt thereof) is dissolved will normally be water, although the water may contain other solvents such as alcohol. The dispersion of macerated pimento will be from 5% to 99% by weight, although many natural pimento scraps will have sufficient moisture content that upon maceration of those scraps, sufficient water will be expelled from the natural pimento for dissolving the alginic acid and no water need be added. This will form the aqueous dispersion, discussed above.

When the shaped dispersion is placed in the setting solution, it must remain in there a sufficient amount of time to provide the properties required for handling and stuffing by conventional means. Thus, the reconstituted pimento must be capable of being looped at least greater than 180° in a radius of at least less than 0.3 inch. For most setting solutions, such as calcium chloride, this will require that the shaped dispersion remain in the setting solution for at least 10 minutes and up to 3 hours or more, depending upon the thickness, the concentration of the setting solution, temperature, etc.

The reconstituted pimento for stuffing the olive will be a shaped and gelled dispersion of macerated natural pimento with the small particle size and the alginic acid (or food-grade salt thereof). This gel will be cross-linked into a non-reversible gel with the food-grade divalent cation. Of course, as noted above, the shape of the reconstituted pimento will be in a form suitable for being inserted into a pitted olive, although the shaping may be by further cutting and sliced if desired. It is important that the non-reversible gel be accomplished, since this significantly contributes to the properties which will allow the present reconstituted pimento to be used in conventional machines and provides the appearance, texture and taste of natural pimento in the stuffed olive.

BRIEF DESCRIPTION OF THE DRAWING

The FIGURE shows in block diagrammatic form the basic steps of the process.

DETAILED DESCRIPTION OF THE INVENTION

The process for producing the reconstituted pimento suitable for stuffing pitted olives with a conventional automatic stuffing machine has two features. The first feature is that the natural pimento must be placed in a form such that the reconstituted pimento will have the texture, appearance and taste of natural pimento. This is accomplished by maceration of the pimento and by careful selection of the gel material and kind of gel which results in the production of the reconstituted pimento. The second major feature is that the reconstituted pimento must have physical properties which allow its use in automatic stuffing machines. This feature depends, primarily, upon the physical properties induced into the gel as well as the non-reversible gel which is produced.

The FIGURE shows the overall basic process. Pimento scrap is macerated to relatively small particle size. The maceration may be any technique desired, including cutting, dicing, slicing and the like, although it is preferred to avoid undue mashing of the pimento, since this tends to reduce the retention of the natural texture of the pimento. Accordingly, a high speed slicing machine is the preferred embodiment. This may take the form of rotating knife blades such as Waring-type blender, of course, on an industrial scale. Alternately, rotating disc blades and the like may be used. The degree of maceration is not narrowly critical, but it must be such that a dispersion of the macerated pimento can be prepared.

The pimento is then dispersed in an aqueous medium having therein alginic acid (or salt thereof). The dispersion need not be stable over a long period of time, but it must be sufficiently stable that the dispersion can be shaped. Thus, a dispersion that is stable for at least 1 to 2 minutes will be acceptable. While the dispersion must be in water, natural pimento often contains sufficient moisture that upon maceration the water liberated from the pimento will be sufficient for forming a dispersion. Therefore, in this regard, no water need be actually added and the present specification and claims are intended to reference dispersion produced from the natural water of pimento. It can also be appreciated that the more pimento in the dispersion the greater will be the retention of natural texture of the pimento. It is therefore advantageous to make the dispersion with as much pimento as possible. In this regard, dispersions with 99% pimento (1% alginic acid and the water from the pimento) are possible, although these dispersions will be quite thick and almost dough-like in form. Such dispersions, nevertheless, can be shaped by certain methods, such as food extruders, and are therefore acceptable to the present invention. On the other hand, if the shaping equipment is better operated with relatively less viscous dispersions, acceptable products can be prepared with amounts of pimento as low as 5% by weight, although at this rather low amount, the pimento taste becomes very diluted. A good working range is from 90% to 98% pimento, although a preferred range is from 94% to 97% pimento.

As can be appreciated, the pimento must be macerated to the point of not only forming the dispersion, but so that the reconstituted pimento will not have a lumpy feel. For both of these reasons, the particle size of the macerated pimento should be relatively small and it is preferred that the maximum dimension of the average macerated particle be less than 0.15 inch, and more preferably, less than 0.05. Of course, the particle size may be as small as desired, e.g., less than 0.01 inch and down to colloidal size, although this finer particle size does not improve the product, and, indeed, some of the natural pimento texture is lost with such high degrees of maceration.

While the present process will normally be practiced with scrap pimento, as discussed above, it may, of course, be practiced with whole pimentos or off-colored or discolored pimentos. In this latter regard, dilution of the off-colored or discolored pimento in properly colored pimento will not adversely affect the color of the resulting reconstituted pimento. Additionally, natural and/or artificial food-grade colors may be added thereto. This provides a very definite economic advantage in that it allows easy use of discolored or off-colored pimentos. Nevertheless, the primary economic advantage of the process is in using parts of natural pimento which are scrapped in the cutting of natural pimento into a shape suitable for inserting into a pitted olive. This forms a very important feature of the present process.

The aqueous medium with which the dispersion of macerated pimento is formed will contain alginic acid or a food-grade salt thereof. In this latter regard, the term "alginic acid" is intended to embrace its food-grade salts, many of which are known to the art and include sodium, magnesium, potassium and ammonium salts. It is not necessary, however, that these salts be entirely of the foregoing and some amounts of calcium, zinc, aluminum, copper and chromium may be included, although these latter salts will make the alginic acid salt water insoluble and the amount thereof must be less than that which will insolubilize the alginic acid.

An important feature of the invention is the careful selection of the gel forming gum. It has been discovered that out of the many possible natural and synthetic gums, alginic acid stands alone in its ability to form a reconstituted pimento shape which not only provides properties acceptable for use in automatic stuffing machines, but also provides texture, taste and mouth-feel that essentially mimics the natural pimento. This is an important feature of the invention and there is no latitude for substitution of the alginic acid with any of the other natural or synthetic gum. This is in contrast to the prior art which would indicate that there is no essential criticality in the selection of the gum for reconstituting fruits and vegetables. In the case of pimentos for stuffing olives, the selection of alginic acid, out of the many possible natural and synthetic gums, is a critical selection which is fundamental to the success of the invention.

The amount of alginic acid present in the reconstituted pimento is also most important. While a gel could be produced with far less than 1% by weight of alginic acid in the dispersion, the resulting gel would not be non-reversible according to the present requirements and would not provide the properties which are provided by the present invention. Thus, the dispersion must have at least 1% alginic acid therein. On the other hand, there is a maximum amount of alginic acid which can be contained in the dispersion, since otherwise the resulting product is too "rubbery" and not only causes difficulty in handling and stuffing, but results in an unacceptable texture and mouth-feel. Preferably, the amount of alginic acid will be from 2% to 8% and clearly superior results are obtained with 2.5 to 4.0%. When an alginate is used, it is preferred that the salt be the sodium salt or the potassium salt, more preferably the sodium salt.

While alginic acid and its salts can function over a wide range of pH, for best gel formation and for best mouth-feel, it is preferred that the dispersion (and the resulting gel-reconstituted pimento) have a pH of between about 5.0 and 8.0, particularly near neutral, i.e., 6.0 to 7.5. The pH can be provided by adding food-grade acids and bases, or by using a buffering system, or by using a buffered alginate, the latter of which is well-known in the art.

The dispersion is then shaped by any desired shaping process, such as molding and extrusion, although extrusion is a preferred form of the invention, since it results in a more economical process. However, if desired, the dispersion could be simply floated onto a large flat plate and scrapped with a doctor blade or the like to provide the required thickness. After setting, the dispersion may be cut to shapes and sizes desired for use in automatic stuffing machines. Alternately, cavity molds may be used in this regard. These processes, however, require more manipulation than extrusion and for this reason extrusion is a preferred form of the shaping operation.

Suitably, the dispersion is extruded in a conventional food-grade extruder. No heat on either the barrel or the die is necessary, although a short heating up to about 170° to 180° F may be used, since this does reduce the viscosity of the dispersion without significantly deteriorating the texture of the pimento. However, temperatures much in excess of this temperature should be avoided for any substantial period of time, since undesired cooking of the pimento can take place and this reduces the otherwise desirable texture of the macerated pimento. The die of the extruder may be of a suitable shape for forming a band or ribbon of the extruded pimento which band or ribbon can be directly utilized without further reshaping by slightly modified conventional stuffing machines. Thus, the dispersion will have a thickness of no greater than 0.5 inch, preferably between 0.1 and 0.4 inch. These thickness dimensions will allow the extruded ribbon to be used directly in stuffing olives, the range of thicknesses depending upon the size of the olives to be stuffed. The ribbon may have a width much in excess of the width that would normally be used for stuffing, and the width of the ribbon may be cut into correctly sized strips or bands by conventional vertically disposed cutting knives as the gelled dispersion exits the extruder die or after setting the dispersion. The thickness, however, is preferably in the range above, since horizontal slicing is more difficult and exacting.

After shaping, e.g., extruding, the dispersion is immediately contacted with a setting solution of a food-grade compound having a water soluble, divalent cation. As is well-known in the art, water soluble, divalent cations cause cross-linking of alginic acid. By providing a concentration of alginic acid, (or the salts thereof) in the dispersion of at least 1%, the divalent cations will act upon the dispersion to form a non-reversible gel thereof. The term "non-reversible" in this regard means that the gel is not thermoplastic in nature and cannot be reversed by heating. Neither is the gel reversible by contacting with conventional food materials, such as alcohol. This is an important feature of the present invention, since it allows the stuffed olives of the present invention to be utilized in essentially the same manner as olives stuffed with natural pimento, which is a decided advantage. Thus the present olives, stuffed with the present reconstituted pimento, may be utilized in cooking without the reconstituted pimento melting and flowing away, which would be totally unacceptable. Additionally, the olives may be used in alcoholic drinks; and as can be easily appreciated, the dissolving of the reconstituted pimento into an alcoholic drink would be totally unacceptable. Under the circumstances, the providing of the non-reversible gel is an important and critical feature to the present invention.

In order to produce a non-reversible gel, the concentration of the alginic acid must be at least 1% and sufficient action of a divalent cation must be provided in order to cause cross-linking of the gel. While the divalent cation may be chosen as desired, it must, of course, be chosen from water-soluble compounds in order that it be presented to the dispersion in divalent ionic form. Additionally, it must be non-toxic and food-grade. Aside from these requirements, the cation is not critical. Suitably, the divalent cation will be an alkaline metal salt, oxide or complex. The anionic portion of a compound is not critical and may be chosen at will, so long as the anionic portion renders the compound water-soluble and is non-toxic and food-grade. Suitably, however, the compound will simply be a salt or oxide (the corresponding hydroxide being considered as an oxide for the present purposes), such as, calcium chloride or magnesium oxide (magnesium hydroxide). Very suitably, the setting compound will simply be calcium chloride, since this meets all of the foregoing requirements, is most economical, and convenient to use.

The concentration of a compound in the setting solution may be from very dilute solutions up to the saturation of the compound in the solution. However, it is preferred that the concentration of the compound be from about 1% to 20% by weight, particularly about from 4% to 8%, since such solutions are more easily handled and provide economic operation of the process.

As noted above, it is critical that the dispersion be formed into a non-reversible gel. Setting solutions of the present nature are not instantaneous in their action, since the first contact of the setting solution with the dispersion will form a gel on the outer portion of the dispersion and that initial gel will impede further movement of the cation into the interior of the dispersion for gelation thereof. If gelation does not occur through the entire dispersion, then any cutting or severing of the gel will expose ungelled dispersions which will flow from the gel. In other words, a completely ungelled dispersion will be similar to a capsule containing a liquid and the breaking of the outer portion will allow the liquid to flow out. As can be easily appreciated, this will be totally unacceptable for many uses of stuffed olives where the olives are severed or where the olive is eaten directly since flowing liquid from the reconstituted pimento would give a decidedly unpleasant texture and mouth-feel. The present invention overcomes problems of this nature by the discovery that with alginic acid in the present concentration, the initial contact of the dispersion and the first gelation thereof do not so impede movement of the cation as to prevent gelation of relatively thin thicknesses of the dispersion. By remaining in contact with the setting solution for a reasonable length of time, the dispersion will continue to gel and an essentially completely gelled dispersion can be obtained in time periods as low as fifteen minutes, depending upon the temperature of the setting solution, the thickness of the dispersion and the concentration of the compound in the setting solution. However, with the present dispersion, time periods of three hours or more may be used, although generally speaking little further gelling takes place after three hours. More usually, the setting period will be from ½ to 2 hours.

While not necessary, the process may be practiced by contacting of the shaped dispersion with setting solutions for time sufficient only to provide a minimum amount of shape sustaining gelation. That so-gelled dispersion may then be removed from the initial setting solution and placed in a separate setting solution for further gelling, within the time periods discussed above. By this method, for example, an extruded shape of dispersion may be immediately contacted with a setting solution bath and continuously removed therefrom after sufficient time for initial shape sustaining gelation. The shape is then stored in vats or barrels for further gelation. This will allow a continuous operation of the extruder. Alternately, the setting solution may be in an extended bath with a serpentine or sinuous flow of the extrudate through the solution, whereby complete setting will take place from the point of entry to the point of exit of the extruded shape into and out of the setting bath.

The temperature of the setting bath can vary widely, but of course, it must be above freezing and below boiling thereof. However, since colder temperatures only increase the gelation time, and since higher temperatures can adversely effect textures by cooking of the pimento, as explained above, it is preferred that the setting solution be at a temperature of between about 50° and 175° F, although temperatures between about 60° and 120° F are preferred. Optimally, the setting bath will simply be at or about room temperature.

After the dispersion has been gelled, it may be washed with fresh water to remove residual amounts of setting solutions from the surface. If the reconstituted pimento is not to be used for stuffing olives for some time, it should be stored under moist conditions. For example, the reconstituted pimento may be stored in a vat or barrel containing the setting solution or alternately in clean water, although with extended storage times, some leaching of the cation may take place.

The reconstituted pimento is then ready for use in stuffing olives and is cut to shape and size for the particular olives being stuffed, which shape and size are well known in the art. The reconstituted pimento is then inserted into a pitted olive by conventional automatic stuffing machines, as described above, and as described in some detail in the referenced patents. The process of stuffing the olives follows the process conventionally practiced in the art. It is not necessary to dry the reconstituted pimento, and it may be handled in a moist state, similar to natural pimento, although if desired, drying of the reconstituted pimento may be practiced with subsequent remoisturization, if desired.

After stuffing the olives, the olives are stored in a saline solution, which is well-known to the art. The saline solution at about 8% to 15% by weight, will cause the olives to be substantially self-preserving.

The reconstituted pimento of the present invention is distinguishable from prior art attempts at producing gelled vegetables, including pimentos, in that the gelation is essentially through the entire section of the reconstituted pimento, which as discussed above avoids any liquification in severing the reconstituted pimento. Additionally, the gel is non-reversible and allows an olive stuffed with the reconstituted pimento to be used both in cooking and alcoholic drinks in the manner of an olive stuffed with natural pimento. The macerated particle size and the level of the critical alginic acid provide texture, taste, and mouth-feel which closely mimic natural pimento. The foregoing makes the reconstituted pimento virtually indistinguishable (in the stuffed olive) from natural pimento. However, the present invention provides yet another very important feature in that the reconstituted pimento is capable of being handled by a conventional automatic stuffing machine. A critical test for determining acceptability of reconstituted pimento for being handled by automatic stuffing machines is that of the reconstituted pimento having shape sustaining properties sufficient to allow the reconstituted pimento to be looped. In this regard, the reconstituted pimento must be capable of being looped to at least greater than 180° in a radius of at least less than 0.3 inch. This test essentially duplicates the looping required for stuffing automatic stuffing machines. In this regard, the term "180°" means that a length of the pimento can be doubled so that the ends thereof are adjacent each other and the loop so formed will have a radius of not greater than 0.3 inch, and that in such a loop, no breaking or tearing of the pimento results. Preferably, however, such looping can take place with a radius which is at least less than 0.2 inch and more preferably 0.1 inch, since this allows stuffing in even smaller pitted olives.

Thus, the process produces a reconstituted pimento stuffed olive wherein the reconstituted pimento is a shaped and gelled dispersion of macerated natural pimento and wherein the particle size of the macerated pimento is at least less than 0.15 inch. The gelation occurs by virtue of a gelling agent which is alginic acid, or a food-grade salt thereof. The properties of the gels of reconstituted pimento are provided by the 1% to 10% by weight level of alginic acid in the reconstituted pimento, whereby the gel may be cross-linked into a non-reversible gel with a food-grade divalent cation. This allows the reconstituted pimento to be in the shape or form which is suitable for being inserted into pitted olives by way of conventional automatic stuffing machines. Otherwise, the properties and parameters described above in connection with the process are equally applicable to the product of the invention and no separate discussion in connection therewith is required.

It should also be appreciated from the above, that care must be taken to ensure that the reconstituted pimento is prepared in a manner consistent with achieving the objectives. Thus, gelation of the dispersion should not occur or substantially commence prior to shaping the dispersion. Neither should gelation be delayed significantly after shaping the dispersion; the required shape may not be maintained. In the former regard, pimentos are often packaged in calcium chloride and when scraps from such pimentos are used in the present process, that calcium chloride should be leached from the scrap pimento by soaking in water, either at room temperature or temperatures of up to 150° F, until the calcium chloride is removed from the pimento, i.e., in the range of an hour or more. The pimento may then be again washed in clean water.

It should also be appreciated that alginic acids are extracted from seaweed and the extract may contain D-mannuronic and L-guluronic acid units, which may vary in proportion between different seaweeds. It is the L-guluronic acid units which have the greater affinity for the divalent cations and which more substantially effect cross-linking therefore. The particular alginic acid should have a predominance of L-guluronic acid units, e.g., 50% on a molar basis or more. All of this is well-known in the art and need not be detailed herein.

As noted above, the concentration of the water-soluble divalent cationic compound in the solution is not critical and may be up to saturation amounts. This will increase the driving force for movement of the cation into the gelling dispersion. However, as can also be appreciated, essentially complete gelation may take place while divalent cations are still moving through the already gelled structure. In that case, excess cations may remain in the gelled structure. Higher amounts of excess ions, e.g., calcium ions, can exhibit a bitter taste in the reconstituted pimento and if such occurs, the reconstituted pimento should be treated to leach the excess cations from the gelled structure. Suitably the reconstituted pimento can be simply soaked in water at temperatures up to 150° F, more preferably about ambient temperatures or slightly higher, for as little as ten minutes of up to several hours or more, to free the gelled reconstituted pimento from these excess cations. Alternately, the gelled reconstituted pimento may be disposed in water and dialyzed with a semi-permeable membrane to remove excess divalent cations. It should also be appreciated that while the cation is defined as a divalent cation, any polyvalent cation will function to cross-link the gelled structure, since more than one valent site will provide the necessary cross-linking.

Under the circumstances, the foregoing disclosure and following claims should be construed in that divalent requires only that the cation have at least two valences and that this definition includes polyvalent, e.g., trivalent.

The best modes of the invention will be illustrated by the Examples, where all percentages and proportions are by weight, unless otherwise noted, but it should be understood that the invention is not limited thereto, but is applicable to the breadth of the foregoing disclosure.

EXAMPLE I

Natural pimentos, stored in calcium chloride aqueous solution, are washed free of excess calcium chloride and acceptable shapes are cut from the individual pimentos, consistent with processing those shapes in a conventional automatic olive stuffing machine. This process results in about 30% of the pimento being of irregular and non-processable shape, e.g., "scrap." This scrap pimento is placed in a high speed, high shear cutting mill wherein rotating blades slice and macerate the scrap pimento. During the maceration, water is expressed from the pimento and an aqueous dispersion of the scrap pimento is prepared. The average particle size of a macerated pimento is less than 0.01 inch.

To the macerated pimento is added dry sodium alginate (essentially the L-guluronic acid form) so that the weight percent of sodium alginate in the macerate pimento is about 3.5%. The dispersion of macerated pimento and sodium alginate is slowly stirred until the sodium alginate is dissolved therein. The resulting dispersion has the consistency of a light dough.

The dispersion is placed in a conventional food-grade extruder, having a rectangular die with a width of 1½ inches and a height of ⅛ inch. The dispersion is extruded with no heat added to the extruder or die to produce a ribbon of the dispersion.

The extrudate passes immediately from the extruder into a setting solution which consists of a 5% solution of calcium chloride. As the extrudate contacts the setting solution, the outside portion of the extrudate begins to gel and after passing through a small part of the setting solution the extrudate has gelled to the point that it can be carefully pulled through the setting solution. The semi-gel, in shape-sustaining form, of the extrudate is then coiled and placed in a vat of 5% calcium chloride and allowed to dwell therein for approximately an hour and three quarters. At this time the extrudate has been fully gelled to a non reversible gel.

The gelled and reconstituted pimento is then washed free of excess calcium chloride and placed in a vat of clean water with a weight ratio of clean water to reconstituted pimento of approximately 5:1. The reconstituted pimento is allowed to dwell in the clean water for approximately three hours, to insure that all free calcium ions are leached from the reconstituted pimento.

After freeing of excess water on the surface of the reconstituted pimento, the strip (1½ inches in width and ⅛ inch in height) is cut into ⅛ inch thick sections and fed to a conventional automatic stuffing machine. This stuffing machine is arranged to cut from the strip of reconstituted pimento individual sections approximately 1½ inches long and these sections are formed in a "V"-shape or loop and stuffed into a green pitted olive, in a conventional manner.

The olives produced, have the appearance, color and texture of olives stuffed with natural pimento. The olives are placed in a 10% saline solution (NaCl) and are vacuum packed to assure self-preservation.

EXAMPLE II

Olives produced according to Example I, remain in the packaged saline solution for six months and no evidence of bacterial action is observed. The olives are unpackaged and evaluated by a taste panel. The panel concludes that the olives are essentially indistinguishable from olives stuffed with natural pimento.

EXAMPLE III

Olives produced according to the process of Example I are sliced so that the reconstituted pimento is severed; there is no flowable inner portion of the reconstituted pimento and the pimento has the appearance and texture of natural pimento. The sliced pimentos are used as a topping for Italian style noodles and baked at 375° for 45 minutes. During the baking no evidence of deterioration or melting of the reconstituted pimento is noted.

EXAMPLE IV

The olives produced according to the process of Example I are placed in a mixture of water and ethyl alcohol (90 proof) and are allowed to dwell therein for 24 hours. There is no evidence of solution or degelation of the reconstituted pimento.

It will be apparent to those skilled in the art that the objects of the invention have been met and that the breadth of the invention is applicable to those embodiments described above, and to those embodiments readily apparent to those skilled in the art. Accordingly, the invention extends to the spirit and scope of the following claims.

What is claimed is:

1. A process for automatically stuffing olives with reconstituted pimento comprising:
   a. macerating natural pimento until the macerated particle size will form a dispersion in an aqueous medium and the average particle size of the macerated pimento is less than 0.15 inch in a maximum dimension;
   b. forming a dispersion of the macerated pimento, which is essentially calcium chloride in an aqueous medium having dissolved therein as the sole essential gelling agent from 1% to 10% by weight of alginic acid or a food-grade salt thereof, calculated as alginic acid per se where the alginic acid has at least 50 molar % of L-guluronic acid units, and the amount of macerated pimento in the dispersion is from 5% to 99% by weight of the dispersion;
   c. shaping the dispersion, which is essentially ungelled, into a form suitable for stuffing a pitted olive and wherein the shaped dispersion has a thickness of no greater than 0.5 inches;
   d. contacting the shaped dispersion with a setting solution of a food-grade compound having a water-soluble, divalent cation for a time period of at least 15 minutes, whereby the alginic acid is non-reversibly gelled throughout the shaped dispersion to a condition that is not reversible by either heat or alcohol and which forms shape-sustaining reconstituted pimento which is capable of being looped at least greater than 180° in a radius of less than 0.3 inch; and e. inserting by means of an automatic olive stuffing machine at least a portion of the reconstituted pimento into a pitted olive.

2. The process of claim 1 wherein the natural pimento comprises parts of natural pimento which are scrapped in cutting natural pimento into a shape suitable for inserting into a pitted olive.

3. The process of claim 1 wherein the natural pimento comprises discolored or off-colored pimento.

4. The process of claim 1 wherein the radius is less than 0.2 inch.

5. The process of claim 4 wherein the radius is less than 0.1 inch.

6. The process of claim 1 wherein the average particle size is less than 0.05 inch.

7. The process of claim 1 wherein the average particle size is less than 0.01 inch.

8. The process of claim 1 wherein the amount of pimento is from 90 to 98%.

9. The process of claim 8 wherein the amount of pimento is from 94 to 97%.

10. The process of claim 1 wherein the amount of alginic acid, or salt, in the dispersion is from 2% to 8% by weight of the dispersion.

11. The process of claim 10 wherein the amount of alginic acid is from 2.5% to 4.0%.

12. The process of claim 1 wherein the salt of the alginic acid is the sodium salt or the potassium salt.

13. The process of claim 1 wherein the pH of the dispersion is from 5.0 to 8.0.

14. The process of claim 13 wherein the pH is from 6.0 to 7.5.

15. The process of claim 1 wherein the thickness is between 0.1 and 0.4 inch.

16. The process of claim 1 wherein the concentration of the compound in the setting solution is up to the saturation thereof.

17. The process of claim 16 wherein the concentration of the compound is from 1% to 20% by weight.

18. The process of claim 17 wherein the concentration is from 4% to 8%.

19. The process of claim 1 wherein the contact time period is less than 3 hours.

20. The process of claim 19 wherein the time period is from ½ to 2 hours.

21. The process of claim 1 wherein after an initial gelation, the so gelled dispersion is removed from the setting solution and placed in separate setting solution for further gelling.

22. The process of claim 1 wherein the setting solution compound is a food-grade salt, oxide or hydroxide.

23. The process of claim 22 wherein the compound is a calcium compound.

24. The process of claim 23 wherein the compound is calcium chloride.

25. The process of claim 1 wherein the temperature of the setting solution is between 60° F and 120° F.

26. A reconstituted pimento stuffed olive wherein the reconstituted pimento has a thickness of no greater than 0.5 inch comprising a shaped and gelled dispersion of 5% to 95% by weight of macerated natural pimento wherein the particle size of the macerated pimento is less than 0.15 inch, the gelling agent is from 1% to 10% by weight alginic acid or a food-grade salt thereof wherein the alginic acid has at least 50 molar % of L-guluronic acid units, and the gel is cross-linked throughout the shaped dispersion into a non-reversible gel with a food-grade divalent cation to a condition that is not reversible by heat or alcohol, the shape of the reconstituted pimento being in a form suitable for being inserted into a pitted olive and being capable of being looped at least 180° in a radius of less than 0.3 inch.

27. The product of claim 26 wherein the natural pimento comprises parts of natural pimento which are scrapped in cutting natural pimento into a shape suitable for inserting into a pitted olive.

28. The product of claim 26 wherein the natural pimento comprises discolored or off-colored pimento.

29. The product of claim 26 wherein the radius is less than 0.2 inch.

30. The product of claim 29 wherein the radius is less than 0.1 inch.

31. The product of claim 26 wherein the average particle size of the macerated pimento is less than 0.05 inch.

32. The product of claim 31 wherein the average particle size is less than 0.01 inch.

33. The product of claim 31 wherein the average particle size is of colloidal size.

34. The product of claim 26 wherein the amount of pimento is from 90 to 98%.

35. The product of claim 34 wherein the amount of pimento is from 94 to 97%.

36. The product of claim 26 wherein the amount of alginic acid, or salt, in the gelled dispersion is from 2% to 8% by weight of the dispersion, calculated as the alginic acid per se.

37. The product of claim 36 wherein the amount of alginic acid is from 2.5% to 4.0%.

38. The product of claim 26 wherein the salt of the alginic acid is the sodium salt or the potassium salt.

39. The product of claim 26 wherein the pH of the reconstituted pimento is from 5.0 to 8.0.

40. The product of claim 39 wherein the pH is from 6.0 to 7.5.

41. The product of claim 26 wherein the reconstituted pimento has a thickness of no greater than 0.4 inch.

42. The product of claim 41 wherein the thickness is between 0.1 and 0.4 inch.

43. The product of claim 26 wherein the cation is derived from a compound which is a food-grade salt, oxide or hydroxide.

44. The product of claim 43 wherein the compound is a calcium compound.

45. The product of claim 44 wherein the compound is calcium chloride.

* * * * *